United States Patent
Kansagra et al.

(10) Patent No.: US 9,736,219 B2
(45) Date of Patent: Aug. 15, 2017

(54) MANAGING OPEN SHARES IN AN ENTERPRISE COMPUTING ENVIRONMENT

(71) Applicant: Bank of America Corporation, Charlotte, NC (US)

(72) Inventors: Chirag Kansagra, Mount Laurel, NJ (US); William O'Callaghan, Ewing, NJ (US); Minesh Shah, West Windsor, NJ (US); Ketankumar Modi, Lawrenceville, NJ (US); Mubarak Chanbaig, Plainsboro, NJ (US); Ritesh Pandey, Pennington, NJ (US); Sriram Chandrasekaran, Bordentown, NJ (US)

(73) Assignee: Bank of America Corporation, Charlotte, NC (US)

( * ) Notice: Subject to any disclaimer, the term of this patent is extended or adjusted under 35 U.S.C. 154(b) by 258 days.

(21) Appl. No.: 14/751,641

(22) Filed: Jun. 26, 2015

(65) Prior Publication Data
US 2016/0381117 A1    Dec. 29, 2016

(51) Int. Cl.
*G06F 15/16* (2006.01)
*H04L 29/08* (2006.01)

(52) U.S. Cl.
CPC .............. *H04L 67/06* (2013.01); *H04L 67/10* (2013.01)

(58) Field of Classification Search
USPC ........................................................ 709/217
See application file for complete search history.

(56) References Cited

U.S. PATENT DOCUMENTS

| | | |
|---|---|---|
| 2004/0193918 A1 | 9/2004 | Green et al. |
| 2015/0067342 A1 | 3/2015 | Pazdziora et al. |
| 2015/0067777 A1 | 3/2015 | Heise |
| 2015/0072400 A1 | 3/2015 | Clarke |
| 2015/0081885 A1 | 3/2015 | Thomas et al. |
| 2015/0081890 A1 | 3/2015 | Richards et al. |
| 2015/0089231 A1 | 3/2015 | Oxford et al. |
| 2015/0089584 A1 | 3/2015 | Lim |
| 2015/0094012 A1 | 4/2015 | Gurajala et al. |
| 2015/0095102 A1 | 4/2015 | Hanley et al. |
| 2015/0096023 A1 | 4/2015 | Mesdaq et al. |
| 2015/0096768 A1 | 4/2015 | DuBrucq et al. |
| 2015/0097678 A1 | 4/2015 | Sloo et al. |
| 2015/0100357 A1 | 4/2015 | Seese et al. |
| 2015/0106876 A1 | 4/2015 | Baldonado et al. |
| 2015/0111591 A1 | 4/2015 | Hoffberg |

(Continued)

*Primary Examiner* — Hee Soo Kim
(74) *Attorney, Agent, or Firm* — Banner & Witcoff, Ltd.; Michael A. Springs

(57) ABSTRACT

Methods, systems, and computer-readable media for managing open shares in an enterprise computing environment are presented. In some embodiments, a computer system may receive a request to scan one or more servers for open shares. Then, the computer system may validate one or more input files associated with the request and verify access to the one or more servers. Next, the computer system may scan the one or more servers to create a runtime share list file identifying one or more open shares. Subsequently, the computer system may identify at least one open share to be remediated and may apply one or more remediation actions to the at least one open share. Thereafter, the computer system may update an output file to include remediation information identifying the one or more remediation actions applied to the at least one open share and may send the output file.

20 Claims, 9 Drawing Sheets

(56) References Cited

U.S. PATENT DOCUMENTS

| | | |
|---|---|---|
| 2015/0111775 A1 | 4/2015 | Iakoubova et al. |
| 2015/0113132 A1 | 4/2015 | Srinivas et al. |
| 2015/0113133 A1 | 4/2015 | Srinivas et al. |
| 2015/0127405 A1 | 5/2015 | Peeler et al. |
| 2015/0128152 A1 | 5/2015 | Lachaume |
| 2015/0133082 A1 | 5/2015 | Broch et al. |
| 2015/0135003 A1 | 5/2015 | Cota-Robles et al. |
| 2015/0135300 A1 | 5/2015 | Ford |
| 2015/0135325 A1 | 5/2015 | Stevens et al. |
| 2015/0140525 A1 | 5/2015 | Metuki |
| 2015/0142935 A1 | 5/2015 | Srinivas et al. |
| 2015/0142936 A1 | 5/2015 | Srinivas et al. |
| 2015/0142962 A1 | 5/2015 | Srinivas et al. |
| 2015/0143482 A1 | 5/2015 | Barkan |
| 2015/0143524 A1 | 5/2015 | Chestna |
| 2015/0150006 A1 | 5/2015 | Fitzgerald et al. |
| 2015/0153982 A1 | 6/2015 | Berarducci et al. |
| 2015/0154703 A1 | 6/2015 | Rohlfs |
| 2015/0154848 A1 | 6/2015 | Sloo et al. |
| 2015/0156098 A1 | 6/2015 | Richards et al. |
| 2015/0161695 A1 | 6/2015 | Koby et al. |
| 2015/0161838 A1 | 6/2015 | Niebanck |
| 2015/0163121 A1 | 6/2015 | Mahaffey et al. |
| 2015/0163179 A1 | 6/2015 | Maes et al. |
| 2015/0163206 A1 | 6/2015 | McCarthy et al. |
| 2015/0163248 A1 | 6/2015 | Epstein |
| 2015/0169353 A1 | 6/2015 | Colla et al. |
| 2015/0169372 A1 | 6/2015 | Salsburg et al. |
| 2015/0170535 A1 | 6/2015 | Negash et al. |
| 2015/0172130 A1 | 6/2015 | Colla et al. |
| 2015/0172300 A1 | 6/2015 | Cochenour |
| 2015/0172307 A1 | 6/2015 | Borohovski et al. |
| 2015/0172308 A1 | 6/2015 | Borohovski et al. |
| 2015/0172311 A1 | 6/2015 | Freedman et al. |

MANAGING OPEN SHARES IN AN ENTERPRISE COMPUTING ENVIRONMENT

BACKGROUND

Aspects of the disclosure relate to computer hardware and software. In particular, one or more aspects of the disclosure generally relate to computer hardware and software for managing open shares in an enterprise computing environment.

Large organizations, such as financial institutions and other enterprise organizations, may utilize and/or maintain large and complex computing environments, which may include various networks, sub-networks, servers, and various other computing devices and computing technology. As these organizations increasingly use computer systems in conducting day-to-day business, it may be increasingly important to such organizations to ensure the safety and security of such computer systems, as well as the safety and security of the enterprise information that may be maintained on such computer systems.

In many instances, however, it may be difficult for network administrators of such organizations to manage the vast number of computer systems and other computing technology that may be used by a particular enterprise organization in an efficient, effective, and convenient manner.

SUMMARY

Aspects of the disclosure relate to various systems and techniques that provide effective, efficient, scalable, and convenient ways of managing computer systems and other computing technology, particularly in ways that involve identifying, remediating, and/or otherwise managing open shares in an enterprise computing environment.

For example, in some instances, an enterprise computing environment of a large organization, such as a financial institution, may include a number of computer systems that have and/or provide open shares. Such open shares may, for example, be files and/or folders that have been shared by a particular user of a particular computer system in the enterprise computing environment with one or more other users of the computer system and/or with one or more other users of other computer systems, including one or more other computer systems that are inside and/or outside of the enterprise computing environment. In addition, different open shares may have different permissions assigned to them, such that different users and/or groups of users may be able to access different open shares in different ways in accordance with such permissions. For example, a first set of users may be able to read data from, but not write data to, a particular open share, while a second set of users may be able to read data from and write data to the particular open share.

While some open shares may exist in an enterprise computing environment for legitimate reasons, for instance, to allow network administrators of an enterprise organization to view log files from different computer systems in the enterprise computing environment, an open share may sometimes be created accidentally, or alternatively, created purposefully by developers or other enterprise users but left open and forgotten about after the particular open share has served its purpose. This may concern an enterprise organization, however, because these inadvertently created or abandoned open shares may pose information security risks to the enterprise organization. For example, in addition to users within the enterprise organization potentially gaining access to information to which they should not have access, other unauthorized users outside of the enterprise organization may be able to maliciously access information available via open shares and/or otherwise gain unauthorized access to enterprise information by taking advantage of open shares.

Given the size and complexity of enterprise computing environments, it may be difficult for network administrators to identify and manage open shares, particularly when certain open shares exist for valid reasons while others were inadvertently created or have been abandoned since their creation. By leveraging aspects of the disclosure, one or more of these and/or other issues may be overcome. For example, in accordance with one or more aspects of the disclosure, a network administrator of an enterprise organization, such as a financial institution, may be able to utilize an open share management and remediation utility that identifies open shares in an enterprise computing environment in an efficient, effective, and/or relatively automated manner. In addition, the open share management and remediation utility may be configured to delete open shares and/or revoke specific access permissions from certain open shares that are identified, while preserving certain other open shares based on one or more whitelists that may be defined by the network administrator of the enterprise organization. Advantageously, one or more aspects of the disclosure may thus enable an enterprise organization to efficiently and effectively manage open shares in a relatively large and complex enterprise computing environment.

In accordance with one or more embodiments, an open share management computing platform having at least one processor, a memory, and a communication interface may receive, via the communication interface, and from an administrative computing device associated with an enterprise organization, a request to scan one or more servers associated with the enterprise organization for open shares. Based on receiving the request to scan the one or more servers associated with the enterprise organization for open shares, the open share management computing platform may validate one or more input files associated with the request to scan the one or more servers associated with the enterprise organization for open shares. Based on validating the one or more input files associated with the request to scan the one or more servers associated with the enterprise organization for open shares, the open share management computing platform may verify access to the one or more servers associated with the enterprise organization to be scanned for open shares. Based on verifying access to the one or more servers associated with the enterprise organization to be scanned for open shares, the open share management computing platform may scan the one or more servers associated with the enterprise organization to create a runtime share list file identifying one or more open shares on the one or more servers associated with the enterprise organization. Based on scanning the one or more servers associated with the enterprise organization to create the runtime share list file identifying one or more open shares on the one or more servers associated with the enterprise organization, the open share management computing platform may identify at least one open share of the one or more open shares on the one or more servers associated with the enterprise organization to be remediated. Based on identifying the at least one open share of the one or more open shares on the one or more servers associated with the enterprise organization to be remediated, the open share management computing platform may apply one or more remediation actions to the at least one open share of the one or more open shares on the one or more servers associated with the enterprise organization. Based on applying the one or more remediation actions to the at least one open share of the one or more open shares on the one or more servers associated with the enterprise organization, the open share management computing platform may update an output file to include remediation information identifying the one or more remediation actions applied to the at least one open share of the one or more open shares on the one or more servers associated with the enterprise organization. Based on updating the output file to include remediation information identifying the one or more remediation actions applied to the at least one open share of the one or more open shares on the one or more servers associated with the enterprise organization, the open share management computing platform may send, via the communication interface, to the administrative computing device associated with the enterprise organization, the output file.

In some embodiments, the administrative computing device may be configured to be used by an administrative user of the enterprise organization. In some instances, the administrative user of the enterprise organization may be an information security administrator of a financial institution.

In some embodiments, the one or more input files associated with the request to scan the one or more servers associated with the enterprise organization for open shares may include a server list file identifying the one or more servers associated with the enterprise organization to be scanned for open shares. In some instances, prior to receiving the request to scan the one or more servers associated with the enterprise organization for open shares, the open share management computing platform may receive, via the communication interface, and from the administrative computing device associated with the enterprise organization, the server list file identifying the one or more servers associated with the enterprise organization to be scanned for open shares.

In some embodiments, the one or more input files associated with the request to scan the one or more servers associated with the enterprise organization for open shares may include an exception share list file identifying one or more whitelisted open shares on at least one server of the one or more servers associated with the enterprise organization. In some instances, prior to receiving the request to scan the one or more servers associated with the enterprise organization for open shares, the open share management computing platform may receive, via the communication interface, and from the administrative computing device associated with the enterprise organization, the exception share list file identifying the one or more whitelisted open shares on the at least one server of the one or more servers associated with the enterprise organization.

In some embodiments, verifying access to the one or more servers associated with the enterprise organization to be scanned for open shares may include establishing one or more network connections to the one or more servers associated with the enterprise organization to be scanned for open shares.

In some embodiments, verifying access to the one or more servers associated with the enterprise organization to be scanned for open shares may include verifying that one or more access privileges are sufficient to access one or more user accounts associated with the one or more servers associated with the enterprise organization to be scanned for open shares.

In some embodiments, applying the one or more remediation actions to the at least one open share of the one or more open shares on the one or more servers associated with the enterprise organization may include deleting a first open share of the one or more open shares on the one or more servers associated with the enterprise organization to remove access to the first open share of the one or more open shares on the one or more servers associated with the enterprise organization.

In some embodiments, applying the one or more remediation actions to the at least one open share of the one or more open shares on the one or more servers associated with the enterprise organization may include modifying a second open share of the one or more open shares on the one or more servers associated with the enterprise organization to remove access to the second open share of the one or more open shares on the one or more servers associated with the enterprise organization for a first group of enterprise users and preserve access to the second open share of the one or more open shares on the one or more servers associated with the enterprise organization for a second group of enterprise users different from the first group of enterprise users.

In some embodiments, updating the output file may include updating the output file to include historical open share information identifying one or more preexisting permissions of the at least one open share of the one or more open shares on the one or more servers associated with the enterprise organization to which the one or more remediation actions were applied.

In some embodiments, updating the output file may include updating the output file to include error information identifying one or more server clusters for manual processing.

In some embodiments, updating the output file may include updating the output file to include error information identifying one or more servers to which one or more network connections were not established.

In some embodiments, based on updating the output file to include remediation information identifying the one or more remediation actions applied to the at least one open share of the one or more open shares on the one or more servers associated with the enterprise organization, the open share management computing platform may publish, via the communication interface, to a file sharing platform associated with the enterprise organization, the output file.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
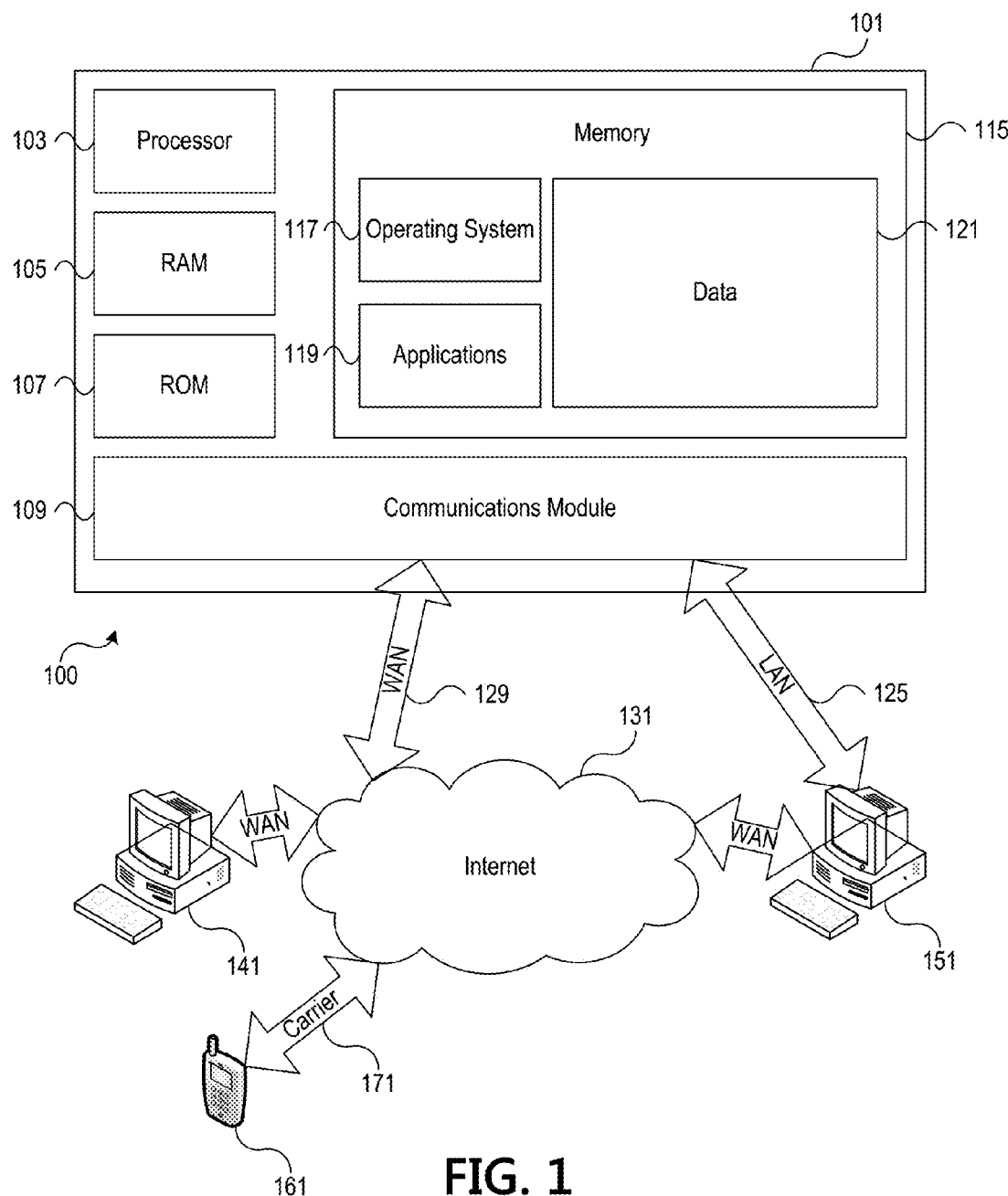
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
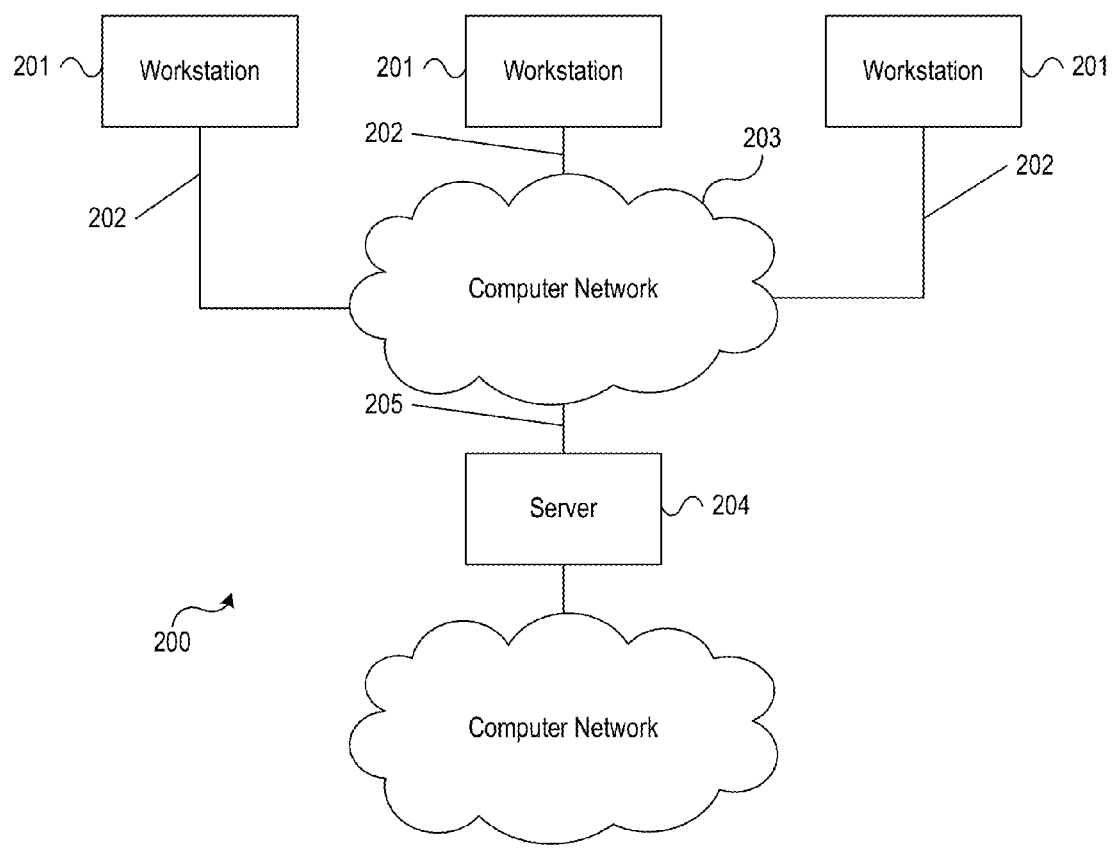
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
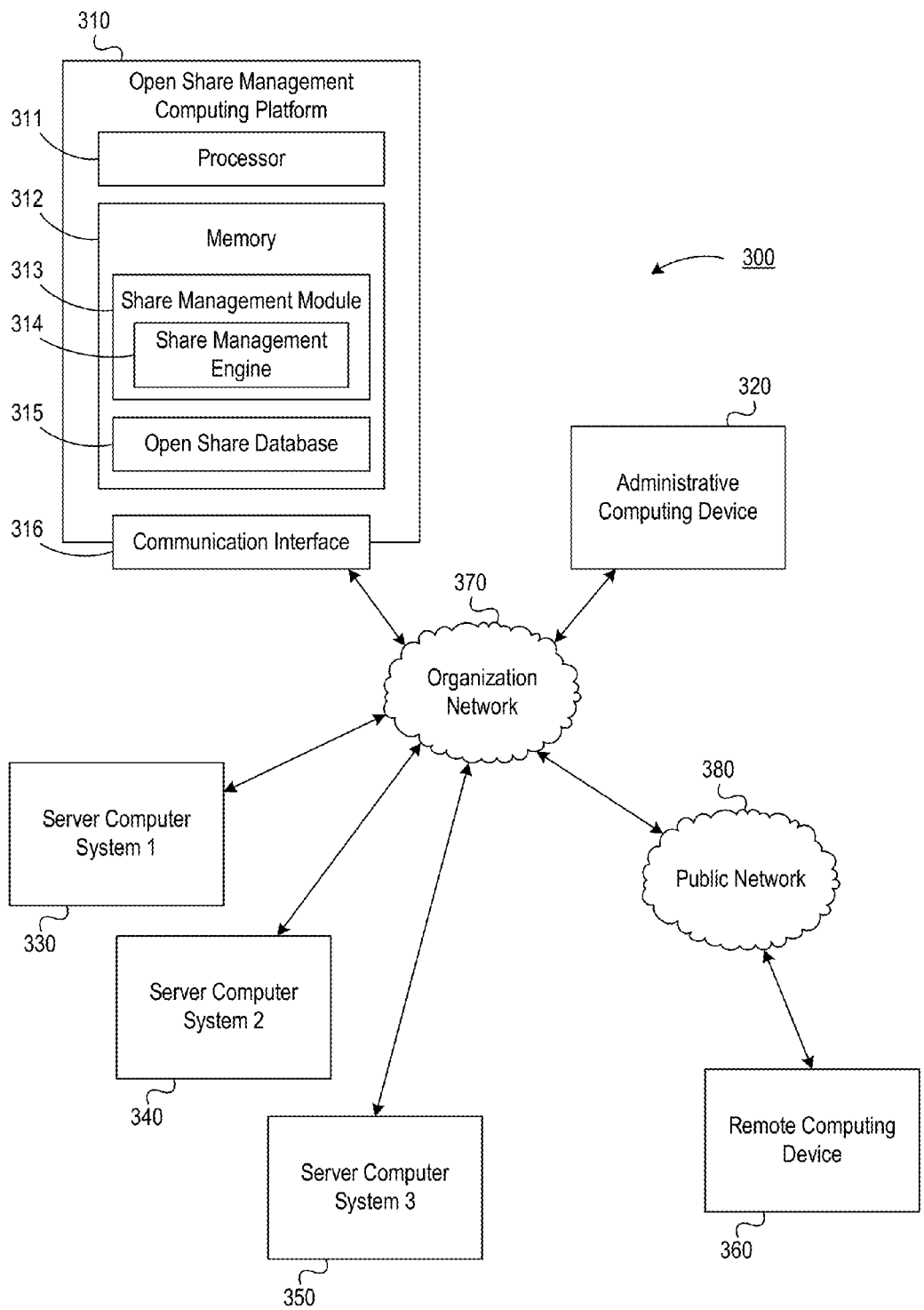
FIG. 3 depicts an illustrative computing environment for managing open shares in an enterprise computing environment in accordance with one or more example embodiments.

FIG. 3 depicts an illustrative computing environment for managing open shares in an enterprise computing environment in accordance with one or more example embodiments. Referring to FIG. 3, computing environment 300 may include one or more computing devices. For example, computing environment 300 may include an administrative computing device 320, a first server computer system 330, a second server computer system 340, a third server computer system 350, and a remote computing device 360. Administrative computing device 320 may, for example, be used by and/or be configured to be used by an administrative user of an organization, such as a network administrator of an enterprise organization (e.g., a financial institution). Server computer system 330, server computer system 340, and server computer system 350 may be computer servers that are owned, operated, and/or maintained by an enterprise organization to store enterprise information and/or provide other functions to various users associated with the enterprise organization. In accordance with various aspects of the disclosure, server computer system 330, server computer system 340, and/or server computer system 350 may have one or more open shares, which may be identified and/or remediated, as illustrated in greater detail below. Remote computing device 360 may, for example, be used by and/or configured to be used by a remote user associated with the organization, such as a network administrator at a remote data center or other location different from a location where one or more of server computer system 330, server computer system 340, and/or server computer system 350 may be located.

Administrative computing device 320, server computer system 330, server computer system 340, server computer system 350, and remote computing device 360 may be any type of computing device capable of receiving a user interface, receiving input via the user interface, and communicating the received input to one or more other computing devices. For example, administrative computing device 320, server computer system 330, server computer system 340, server computer system 350, and remote computing device 360 may be a server computer, a desktop computer, laptop computer, tablet computer, smart phone, or the like. As noted above, and as illustrated in greater detail below, any and/or all of administrative computing device 320, server computer system 330, server computer system 340, server computer system 350, and remote computing device 360 may, in some instances, be special-purpose computing devices configured to perform specific functions.

Computing environment 300 also may include one or more computing platforms. For example, computing environment 300 may include open share management computing platform 310. Open share management computing platform 310 may include one or more computing devices configured to perform one or more of the functions described herein. For example, open share management computing platform 310 may include one or more computers (e.g., laptop computers, desktop computers, servers, server blades, or the like).

Computing environment 300 also may include one or more networks, which may interconnect one or more of open share management computing platform 310, administrative computing device 320, server computer system 330, server computer system 340, server computer system 350, and remote computing device 360. For example, computing environment 300 may include organization network 370 and public network 380. Organization network 370 and/or public network 380 may include one or more sub-networks (e.g., LANs, WANs, or the like). Organization network 370 may be associated with a particular organization (e.g., a corporation, financial institution, educational institution, governmental institution, or the like) and may interconnect one or more computing devices associated with the organization. For example, open share management computing platform 310, administrative computing device 320, server computer system 330, server computer system 340, and server computer system 350 may be associated with an organization (e.g., a financial institution), and organization network 370 may be associated with and/or operated by the organization, and may include one or more networks (e.g., LANs, WANs, VPNs, or the like) that interconnect open share management computing platform 310, administrative computing device 320, server computer system 330, server computer system 340, and server computer system 350 and one or more other computing devices and/or computer systems that are used by, operated by, and/or otherwise associated with the organization, including one or more other servers that may be scanned for open shares by open share management computing platform 310, as illustrated in greater detail below. Public network 380 may connect organization network 370 and/or one or more computing devices connected thereto (e.g., open share management computing platform 310, administrative computing device 320, server computer system 330, server computer system 340, and server computer system 350) with one or more networks and/or computing devices that are not associated with the organization. For example, remote computing device 360 might not be associated with an organization that operates organization network 370 (e.g., because remote computing device 360 may be owned and/or operated by one or more entities different from the organization that operates organization network 370, such as a remote network administrator, rather than being owned and/or operated by the organization itself or an employee or affiliate of the organization), and public network 380 may include one or more networks (e.g., the internet) that connect remote computing device 360 to organization network 370 and/or one or more computing devices connected thereto (e.g., open share management computing platform 310, administrative computing device 320, server computer system 330, server computer system 340, and server computer system 350).

Open share management computing platform 310 may include one or more processors 311, memory 312, and communication interface 316. A data bus may interconnect processor(s) 311, memory 312, and communication interface 316. Communication interface 316 may be a network interface configured to support communication between open share management computing platform 310 and organization network 370 and/or one or more sub-networks thereof. Memory 312 may include one or more program modules having instructions that when executed by processor(s) 311 cause open share management computing platform 310 to perform one or more functions described herein and/or one or more databases that may store and/or otherwise maintain information which may be used by such program modules and/or processor(s) 311. For example, memory 312 may include share management module 313, which may include instructions that when executed by processor(s) 311 cause open share management computing platform 310 to perform one or more functions described herein, such as instructions for managing open shares in an enterprise computing environment, as illustrated in greater detail below. For instance, share management module 313 may include executable instructions for and/or otherwise provide a share management engine 314, which may be used in scanning one or more servers, such as server computer system 330, server computer system 340, and/or server computer system 350, for open shares and/or in deleting and/or otherwise modifying one or more open shares that may be identified on such servers, as illustrated in greater detail below. In addition, memory 312 may include an open share database 315, which may store information identifying one or more servers that are to be scanned for open shares by open share management computing platform 310 and/or that have been previously been scanned for open shares by open share management computing platform 310, one or more whitelisted open shares on one or more specific servers, and/or other information that may be used by open share management computing platform 310 and/or share management engine 314 in managing open shares in an enterprise computing environment, as illustrated in greater detail below.

Figure 4A:
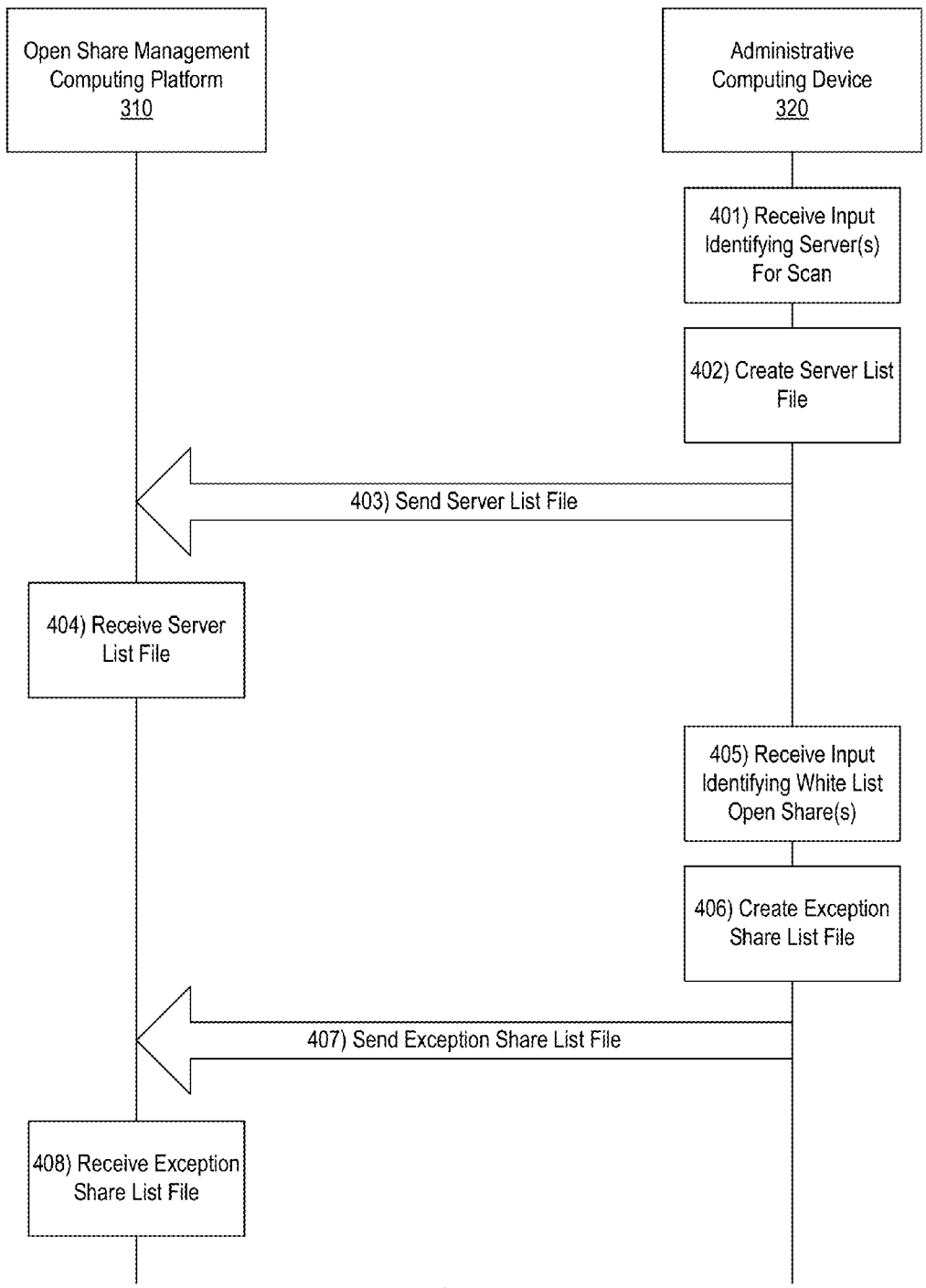
FIGS. 4A-4C depict an illustrative event sequence for managing open shares in an enterprise computing environment in accordance with one or more example embodiments.
Figure 4B:
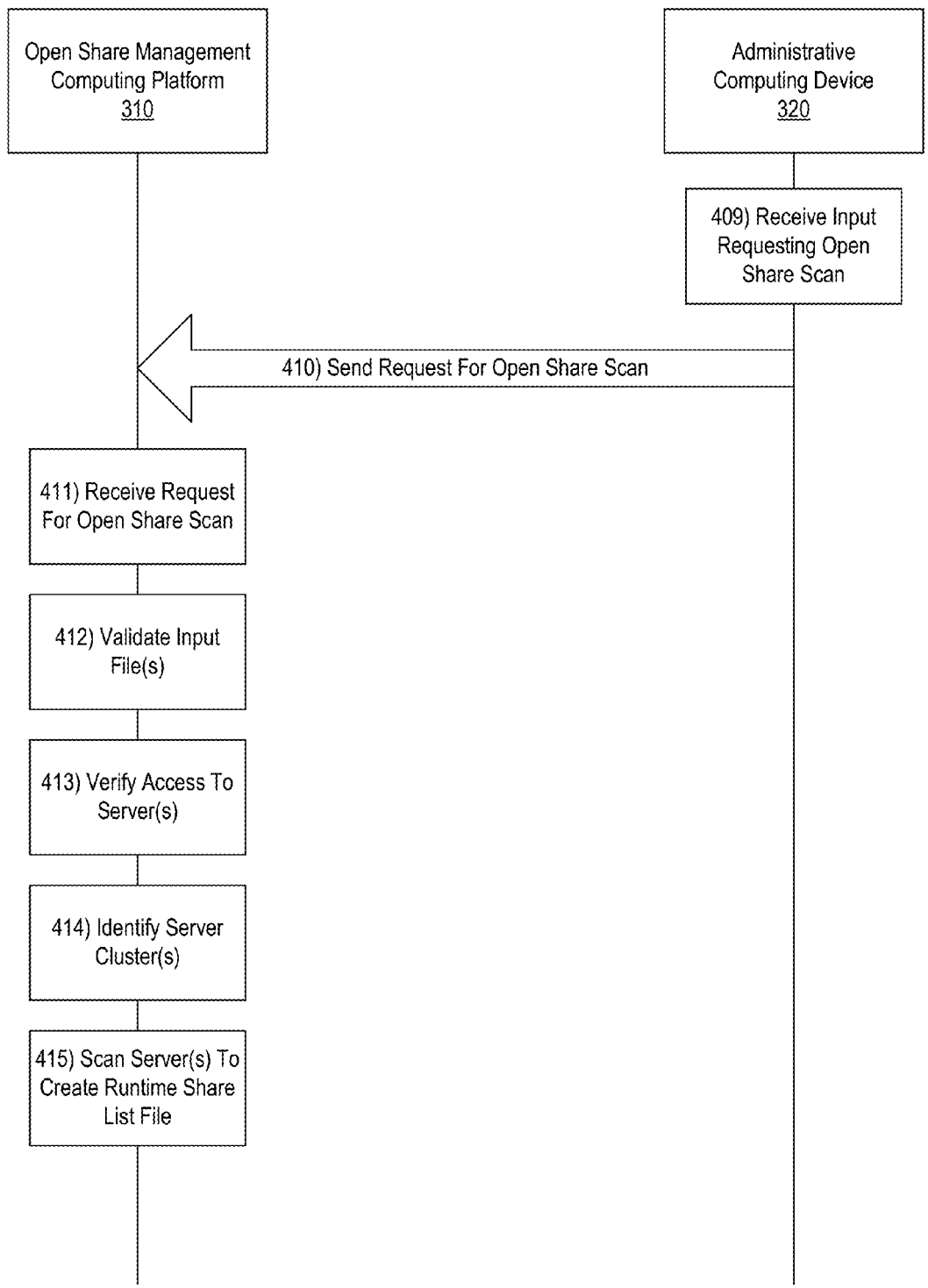
Figure 4C:
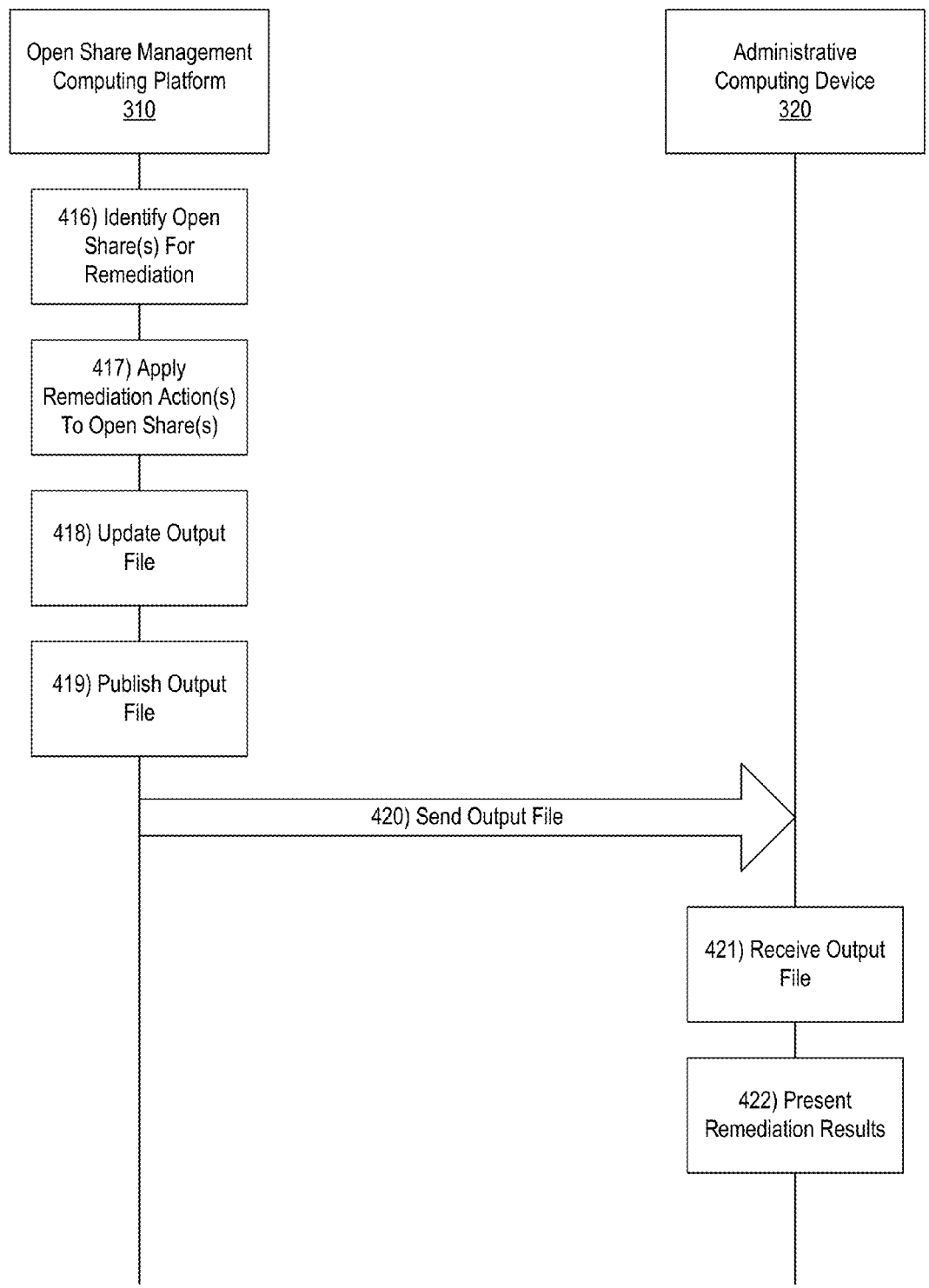

FIGS. 4A-4C depict an illustrative event sequence for managing open shares in an enterprise computing environment in accordance with one or more example embodiments. Referring to FIG. 4A, at step 401, administrative computing device 320 may receive input identifying one or more servers to be scanned for open shares. For example, computing environment 300 may include a number of computer systems, such as server computer system 330, server computer system 340, and/or server computer system 350, which may each have and/or provide one or more open shares. Such open shares may, for example, be files and/or folders that have been shared by a particular user of a particular computer system in computing environment 300 with one or more other users of the computer system and/or with one or more other users of other computer systems, including one or more other computer systems that are inside and/or outside of computing environment 300. In addition, different open shares may have different permissions assigned to them, such that different users and/or groups of users may be able to access different open shares in different ways in accordance with such permissions. For example, a first set of users may be able to read data from, but not write data to, a particular open share, while a second set of users may be able to read data from and write data to the particular open share. Thus, at step 401, administrative computing device 320 may, for example, receive input identifying one or more of server computer system 330, server computer system 340, and server computer system 350 as servers in computing environment 300 to be scanned for open shares by open share management computing platform 310.

Figure 5:
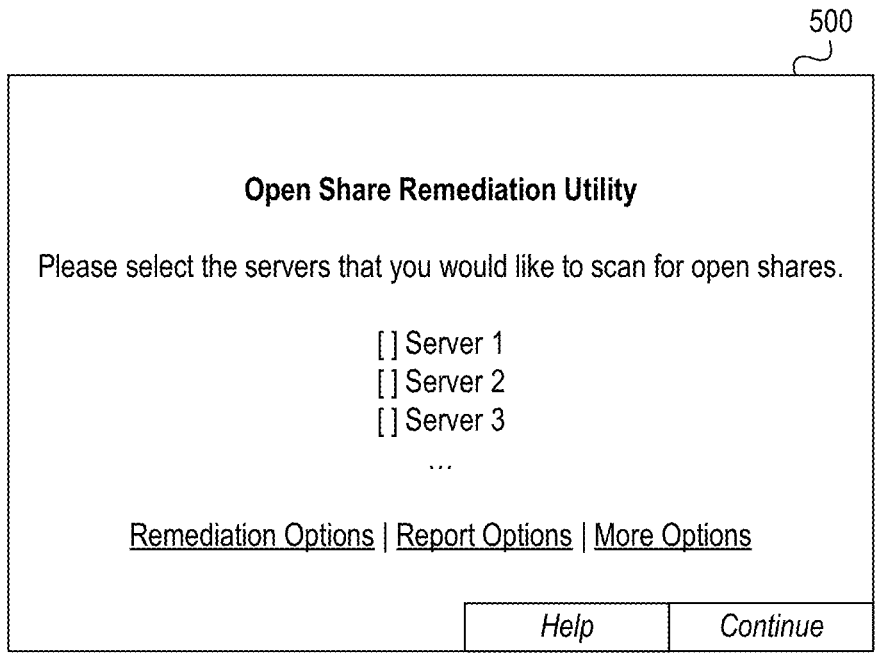
FIGS. 5-8 depict example graphical user interfaces for managing open shares in an enterprise computing environment in accordance with one or more example embodiments.

In some instances, in receiving input identifying one or more servers to be scanned for open shares, such as one or more of server computer system 330, server computer system 340, and server computer system 350, administrative computing device 320 may present one or more graphical user interfaces associated with an open share management and remediation utility (which may, e.g., be provided by a software application executing on administrative computing device 320). For example, in receiving input identifying one or more servers to be scanned for open shares, administrative computing device 320 may display, cause to be displayed, and/or otherwise present a graphical user interface similar to graphical user interface 500, which is illustrated in FIG. 5. As seen in FIG. 5, graphical user interface 500 may include text and/or other information prompting the user of administrative computing device 320 to select and/or identify one or more servers to be scanned for open shares and may provide the user of administrative computing device 320 with one or more links to access preference pages that may be provided by the open share management and remediation utility, such as one or more preference pages allowing the user of administrative computing device 320 to set different remediation options, reporting options, and/or other options.

At step 402, administrative computing device 320 may create a server list file. For example, at step 402, administrative computing device 320 may create a server list file based on the input received at step 401, and the server list file may include information identifying the one or more servers to be scanned for open shares, as specified by the input received at step 401. At step 403, administrative computing device 320 may send the server list file to open share management computing platform 310. At step 404, open share management computing platform 310 may receive the server list file from administrative computing device 320.

At step 405, administrative computing device 320 may receive input identifying one or more whitelist open shares. For example, one or more open shares that may exist in computing environment 300 may be legitimate and/or otherwise valid open shares that a network administrator (who may, e.g., be using administrative computing device 320) may wish to preserve. Such a network administrator may thus provide input identifying such legitimate and/or otherwise valid open shares, which may, for example, be received by administrative computing device 320 at step 405 as input identifying such legitimate and/or otherwise valid open shares as "whitelist" open shares.

Figure 6:
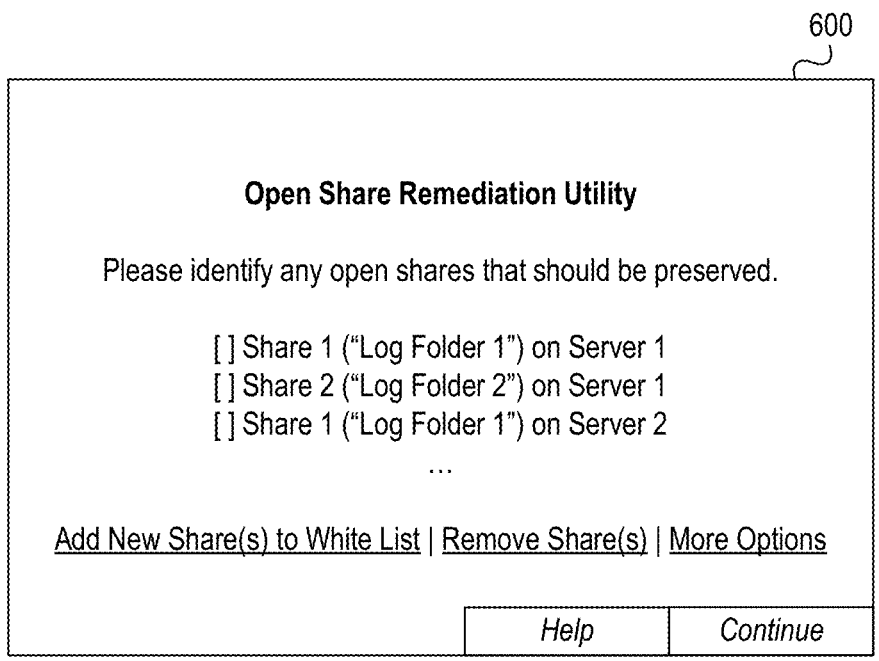

In some instances, in receiving input identifying one or more whitelist open shares, such as one or more legitimate and/or otherwise valid open shares that may exist on and/or otherwise be provided by one or more of server computer system 330, server computer system 340, and server computer system 350, administrative computing device 320 may present one or more graphical user interfaces associated with the open share management and remediation utility (which may, e.g., be provided by a software application executing on administrative computing device 320). For example, in receiving input identifying one or more whitelist open shares, administrative computing device 320 may display, cause to be displayed, and/or otherwise present a graphical user interface similar to graphical user interface 600, which is illustrated in FIG. 6. As seen in FIG. 6, graphical user interface 600 may include text and/or other information prompting the user of administrative computing device 320 to select and/or identify one or more legitimate and/or otherwise valid open shares that may exist on and/or otherwise be provided by one or more servers and may provide the user of administrative computing device 320 with one or more links to access preference pages that may be provided by the open share management and remediation utility, such as one or more preference pages allowing the user of administrative computing device 320 to add new open shares to the whitelist, remove certain open shares from the whitelist, and/or set other options.

At step 406, administrative computing device 320 may create an exception share list file. For example, at step 406, administrative computing device 320 may create an exception share list file based on the input received at step 405, and the exception share list file may include information identifying the one or more whitelist open shares, as specified by the input received at step 405. At step 407, administrative computing device 320 may send the exception share list file to open share management computing platform 310. At step 408, open share management computing platform 310 may receive the exception share list file from administrative computing device 320.

Figure 7:
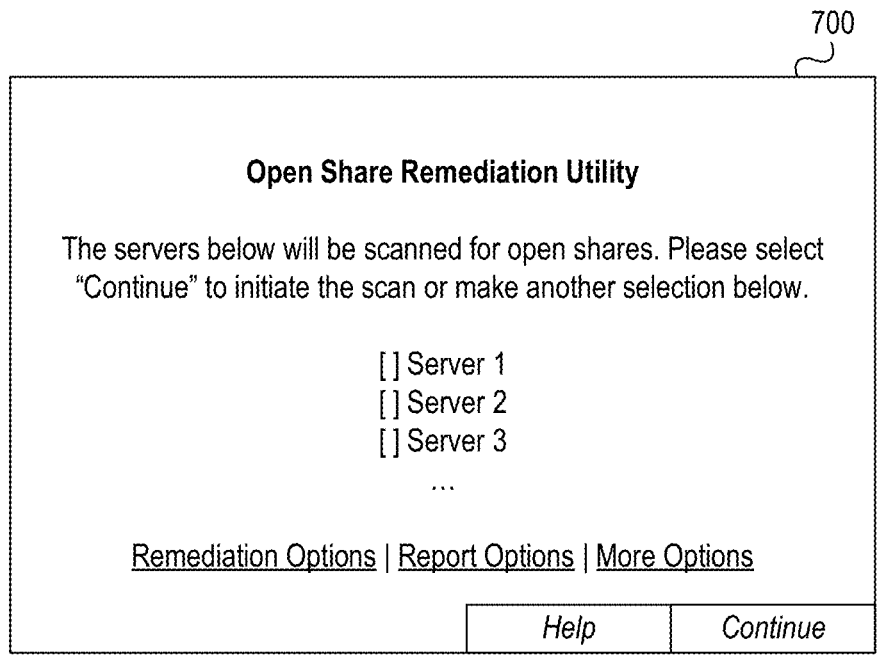

Referring to FIG. 4B, at step 409, administrative computing device 320 may receive input requesting an open share scan. For example, at step 409, administrative computing device 320 may receive input from the user of administrative computing device 320 (who may, e.g., be a network administrator associated with computing environment 300), and such input may correspond to a request to scan one or more servers for open shares and/or apply one or more remediation actions, for instance, based on the server list file, the exception share list file, and/or other input provided by the user of administrative computing device 320 to administrative computing device 320. In some instances, in receiving input requesting an open share scan, administrative computing device 320 may present one or more graphical user interfaces associated with the open share management and remediation utility (which may, e.g., be provided by a software application executing on administrative computing device 320). For example, in receiving input requesting an open share scan, administrative computing device 320 may display, cause to be displayed, and/or otherwise present a graphical user interface similar to graphical user interface 700, which is illustrated in FIG. 7. As seen in FIG. 7, graphical user interface 700 may include text and/or other information informing the user of administrative computing device 320 of which servers will be scanned for open shares and may provide the user of administrative computing device 320 with one or more links to access preference pages that may be provided by the open share management and remediation utility, such as one or more preference pages allowing the user of administrative computing device 320 to set and/or otherwise modify one or more remediation options, reporting options, and/or other options.

At step 410, administrative computing device 320 may send a request for an open share scan to open share management computing platform 310. For example, at step 410, administrative computing device 320 may send a request for an open share scan to open share management computing platform 310 based on the input received by administrative computing device 320 at step 409.

At step 411, open share management computing platform 310 may receive the request for the open share scan from administrative computing device 320. For example, at step 411, open share management computing platform 310 may receive, via the communication interface (e.g., communication interface 316), and from an administrative computing device associated with an enterprise organization (e.g., administrative computing device 320), a request to scan one or more servers associated with the enterprise organization for open shares. In some embodiments, the administrative computing device may be configured to be used by an administrative user of the enterprise organization. For example, administrative computing device 320 may be configured to be used by an administrative user of the enterprise organization operating open share management computing platform 310 and/or the one or more servers to be scanned for open shares. In some instances, the administrative user of the enterprise organization may be an information security administrator of a financial institution. For example, the administrative user of the enterprise organization who may, e.g., use administrative computing device 320 to create and/or send to open share management computing platform 310 the request to scan one or more servers associated with the enterprise organization for open shares) may be an information security administrator of a financial institution, such as an information security analyst of a large consumer bank.

At step 412, open share management computing platform 310 may validate one or more input files. For example, based on receiving the request to scan the one or more servers associated with the enterprise organization for open shares (e.g., at step 411), open share management computing platform 310 may, at step 412, validate one or more input files associated with the request to scan the one or more servers associated with the enterprise organization for open shares. In validating the one or more input files associated with the request to scan the one or more servers associated with the enterprise organization for open shares, open share management computing platform 310 may, for instance, check that a server list file and/or an exception share list file have been received from administrative computing device 320 and/or otherwise exist (e.g., in open share database 315). If open share management computing platform 310 determines that the server list file and/or the exception share list file have not been received from administrative computing device 320 and/or otherwise do not exist, open share management computing platform 310 may, for instance, generate and/or send one or more error messages (e.g., by sending one or more error messages to administrative computing device 320, by writing one or more messages to an output file that may be sent to administrative computing device 320 and/or published to one or more other computer systems, or the like). Alternatively, if open share management computing platform 310 determines that the server list file and/or the exception share list file have been received from administrative computing device 320 and/or otherwise exist, the event sequence may, for instance, proceed as discussed below.

In some embodiments, the one or more input files associated with the request to scan the one or more servers associated with the enterprise organization for open shares may include a server list file identifying the one or more servers associated with the enterprise organization to be scanned for open shares. For example, the one or more input files associated with the request to scan the one or more servers associated with the enterprise organization for open shares (which may, e.g., be validated by open share management computing platform 310 at step 412) may include a server list file identifying the one or more servers associated with the enterprise organization to be scanned for open shares.

In some embodiments, prior to receiving the request to scan the one or more servers associated with the enterprise organization for open shares, open share management computing platform 310 may receive, via the communication interface (e.g., communication interface 316), and from the administrative computing device associated with the enterprise organization (e.g., administrative computing device 320), the server list file identifying the one or more servers associated with the enterprise organization to be scanned for open shares. For example, in some instances, prior to receiving the request to scan the one or more servers associated with the enterprise organization for open shares (e.g., at step 411), open share management computing platform 310 may receive, via the communication interface (e.g., communication interface 316), and from the administrative computing device associated with the enterprise organization (e.g., administrative computing device 320), the server list file identifying the one or more servers associated with the enterprise organization to be scanned for open shares (e.g., at step 404, as illustrated above).

In some embodiments, the one or more input files associated with the request to scan the one or more servers associated with the enterprise organization for open shares may include an exception share list file identifying one or more whitelisted open shares on at least one server of the one or more servers associated with the enterprise organization. For example, the one or more input files associated with the request to scan the one or more servers associated with the enterprise organization for open shares (which may, e.g., be validated by open share management computing platform 310 at step 412) may include an exception share list file identifying one or more whitelisted open shares on at least one server of the one or more servers associated with the enterprise organization.

In some embodiments, prior to receiving the request to scan the one or more servers associated with the enterprise organization for open shares, open share management computing platform 310 may receive, via the communication interface (e.g., communication interface 316), and from the administrative computing device associated with the enterprise organization (e.g., administrative computing device 320), the exception share list file identifying the one or more whitelisted open shares on the at least one server of the one or more servers associated with the enterprise organization. For example, in some instances, prior to receiving the request to scan the one or more servers associated with the enterprise organization for open shares (e.g., at step 411), open share management computing platform 310 may receive, via the communication interface (e.g., communication interface 316), and from the administrative computing device associated with the enterprise organization (e.g., administrative computing device 320), the exception share list file identifying the one or more whitelisted open shares on the at least one server of the one or more servers associated with the enterprise organization (e.g., at step 408, as illustrated above).

At step 413, open share management computing platform 310 may verify access to one or more servers. For example, based on validating the one or more input files associated with the request to scan the one or more servers associated with the enterprise organization for open shares (e.g., at step 412), open share management computing platform 310 may, at step 413, verify access to the one or more servers associated with the enterprise organization to be scanned for open shares. In verifying access to the one or more servers associated with the enterprise organization to be scanned for open shares, open share management computing platform 310 may, for instance, check that one or more connections are available from open share management computing platform 310 to each of the one or more servers associated with the enterprise organization to be scanned for open shares, that sufficient access privileges exist for open share management computing platform 310 to access one or more user accounts on each of the one or more servers associated with the enterprise organization to be scanned for open shares, and/or the like. If open share management computing platform 310 determines that one or more connections are not available from open share management computing platform 310 to each of the one or more servers associated with the enterprise organization to be scanned for open shares, that sufficient access privileges do not exist for open share management computing platform 310 to access one or more user accounts on each of the one or more servers associated with the enterprise organization to be scanned for open shares, and/or the access to each of the one or more servers associated with the enterprise organization to be scanned for open shares otherwise cannot be verified, open share management computing platform 310 may, for instance, generate and/or send one or more error messages (e.g., by sending one or more error messages to administrative computing device 320, by writing one or more messages to an output file that may be sent to administrative computing device 320 and/or published to one or more other computer systems, or the like). Alternatively, if open share management computing platform 310 determines that one or more connections are available from open share management computing platform 310 to each of the one or more servers associated with the enterprise organization to be scanned for open shares, that sufficient access privileges exist for open share management computing platform 310 to access one or more user accounts on each of the one or more servers associated with the enterprise organization to be scanned for open shares, and/or that the access to each of the one or more servers associated with the enterprise organization to be scanned for open shares is otherwise verified, the event sequence may, for instance, proceed as discussed below.

In some embodiments, verifying access to the one or more servers associated with the enterprise organization to be scanned for open shares may include establishing one or more network connections to the one or more servers associated with the enterprise organization to be scanned for open shares. For example, in verifying access to the one or more servers associated with the enterprise organization to be scanned for open shares (e.g., at step 413), open share management computing platform 310 may establish one or more network connections to the one or more servers associated with the enterprise organization to be scanned for open shares.

In some embodiments, verifying access to the one or more servers associated with the enterprise organization to be scanned for open shares may include verifying that one or more access privileges are sufficient to access one or more user accounts associated with the one or more servers associated with the enterprise organization to be scanned for open shares. For example, in verifying access to the one or more servers associated with the enterprise organization to be scanned for open shares (e.g., at step 413), open share management computing platform 310 may verify that one or more access privileges are sufficient to access one or more user accounts associated with the one or more servers associated with the enterprise organization to be scanned for open shares. For instance, in verifying that one or more access privileges are sufficient to access one or more user accounts associated with the one or more servers associated with the enterprise organization to be scanned for open shares, open share management computing platform 310 may check that open share management computing platform 310 has sufficient access privileges to access an administrator account on each server of the one or more servers associated with the enterprise organization to be scanned for open shares and/or another user account on each server of the one or more servers associated with the enterprise organization to be scanned for open shares that provides open share management computing platform 310 with read and/or write access privileges that allow open share management computing platform 310 to scan for, create, delete, and/or otherwise modify one or more open shares on each server of the one or more servers associated with the enterprise organization to be scanned for open shares.

At step 414, open share management computing platform 310 may identify one or more server clusters. For example, at step 414, may determine whether any of the one or more servers associated with the enterprise organization to be scanned for open shares are server clusters, as open share management computing platform 310 might not be able to scan such server clusters in some instances. Rather, such server clusters may, in some instances, require manual processing, and if at step 414 open share management computing platform 310 identifies any server clusters among the one or more servers associated with the enterprise organization to be scanned for open shares, open share management computing platform 310 may write one or more server cluster exception messages to an output file, such as a cluster share list output file, which may be sent to administrative computing device 320 and/or published to one or more other computer systems by open share management computing platform 310. In some instances, a server cluster may be a collection of servers, and each server of the server cluster may operate as a node that communicates with other servers in the server cluster to provide various services to one or more clients of the server cluster.

At step 415, open share management computing platform 310 may scan one or more servers to create a runtime share list file. For example, based on verifying access to the one or more servers associated with the enterprise organization to be scanned for open shares (e.g., at step 413), open share management computing platform 310 may, at step 415, scan the one or more servers associated with the enterprise organization to create a runtime share list file identifying one or more open shares on the one or more servers associated with the enterprise organization. In scanning the one or more servers associated with the enterprise organization to create the runtime share list file identifying one or more open shares on the one or more servers associated with the enterprise organization, open share management computing platform 310 may, for example, use one or more network tools and/or commands available to open share management computing platform 310 via an operating system running on open share management computing platform 310 and/or on the one or more servers being scanned by open share management computing platform 310 to identify any and/or all of the open shares that may exist on the one or more servers being scanned by open share management computing platform 310. The runtime share list file which may, for instance, be created by open share management computing platform 310 may, for example, include information identifying each open share found by open share management computing platform 310 and may be dynamically created by open share management computing platform 310 at runtime to enable further processing of the identified open shares and/or to catalog information associated with the identified open shares, such as the existing access privileges associated with such open shares and/or other information associated with the identified open shares.

Referring to FIG. 4C, at step 416, open share management computing platform 310 may identify one or more open shares for remediation. For example, based on scanning the one or more servers associated with the enterprise organization to create the runtime share list file identifying one or more open shares on the one or more servers associated with the enterprise organization (e.g., at step 415), open share management computing platform 310 may, at step 416, identify at least one open share of the one or more open shares on the one or more servers associated with the enterprise organization to be remediated. In identifying the at least one open share of the one or more open shares on the one or more servers associated with the enterprise organization to be remediated, open share management computing platform 310 may, for example, determine that the one or more open shares on the one or more servers associated with the enterprise organization which are identified in the runtime share list file that are not whitelisted open shares which are identified in the exception share list file are the one or more open shares to be remediated. In this manner, open share management computing platform 310 may, for instance, preserve the whitelisted open shares, while applying one or more remediation actions to the other open shares found in the scanning process, as illustrated in greater detail below.

At step 417, open share management computing platform 310 may apply one or more remediation actions to one or more open shares. For example, based on identifying the at least one open share of the one or more open shares on the one or more servers associated with the enterprise organization to be remediated (e.g., at step 416), open share management computing platform 310 may, at step 417, apply one or more remediation actions to the at least one open share of the one or more open shares on the one or more servers associated with the enterprise organization. For example, in applying the one or more remediation actions, for each identified open share that is not white-listed, open share management computing platform 310 may copy the existing permissions of the particular open share to create a record of such existing permissions in an output file, and then open share management computing platform 310 may remove certain permissions for the particular open share based on one or more parameters defined in the input files (e.g., open share management computing platform 310 may delete the particular open share to remove access to the open share for all users, may modify the access permissions of the particular open share to remove access to the open share for one or more specific users and/or one or more specific groups of users, or the like). After removing and/or otherwise modifying such permissions for the particular open share, open share management computing platform 310 may commit the changes to the particular server on which the particular open share exists (e.g., by updating permissions information for the particular open share on the particular computer system that hosts or hosted the particular open share). In some instances, open share management computing platform 310 might not remove permissions for one or more open shares even though such shares are not whitelisted; rather, open share management computing platform 310 may, in some instances, simply create a report identifying open shares found during the scan.

In some embodiments, applying the one or more remediation actions to the at least one open share of the one or more open shares on the one or more servers associated with the enterprise organization may include deleting a first open share of the one or more open shares on the one or more servers associated with the enterprise organization to remove access to the first open share of the one or more open shares on the one or more servers associated with the enterprise organization. For example, in applying the one or more remediation actions to the at least one open share of the one or more open shares on the one or more servers associated with the enterprise organization (e.g., at step 417), open share management computing platform 310 may delete a first open share of the one or more open shares on the one or more servers associated with the enterprise organization to remove access to the first open share of the one or more open shares on the one or more servers associated with the enterprise organization. For instance, open share management computing platform 310 may delete the first open share of the one or more open shares on the one or more servers associated with the enterprise organization to remove access rights from all users of the enterprise organization, thus preventing all users of the enterprise organization from accessing the first open share.

In some embodiments, applying the one or more remediation actions to the at least one open share of the one or more open shares on the one or more servers associated with the enterprise organization may include modifying a second open share of the one or more open shares on the one or more servers associated with the enterprise organization to remove access to the second open share of the one or more open shares on the one or more servers associated with the enterprise organization for a first group of enterprise users and preserve access to the second open share of the one or more open shares on the one or more servers associated with the enterprise organization for a second group of enterprise users different from the first group of enterprise users. For example, in applying the one or more remediation actions to the at least one open share of the one or more open shares on the one or more servers associated with the enterprise organization (e.g., at step 417), open share management computing platform 310 may modify a second open share of the one or more open shares on the one or more servers associated with the enterprise organization to remove access to the second open share of the one or more open shares on the one or more servers associated with the enterprise organization for a first group of enterprise users and preserve access to the second open share of the one or more open shares on the one or more servers associated with the enterprise organization for a second group of enterprise users different from the first group of enterprise users. For instance, open share management computing platform 310 may modify the second open share of the one or more open shares on the one or more servers associated with the enterprise organization to remove access rights to the second open share for certain users (e.g., thus preventing such users from accessing the second open share), while preserving access rights for other users (e.g., thus allowing such other users to continue access the second open share).

At step 418, open share management computing platform 310 may update an output file. For example, based on applying the one or more remediation actions to the at least one open share of the one or more open shares on the one or more servers associated with the enterprise organization (e.g., at step 417), open share management computing platform 310 may, at step 418, update an output file to include remediation information identifying the one or more remediation actions applied to the at least one open share of the one or more open shares on the one or more servers associated with the enterprise organization. In updating such an output file, open share management computing platform 310 may, for example, create and/or modify an open share cleanup output file to include information cataloging the remediation actions applied by open share management computing platform 310 to various open shares (e.g., at step 417).

In some embodiments, updating the output file may include updating the output file to include historical open share information identifying one or more preexisting permissions of the at least one open share of the one or more open shares on the one or more servers associated with the enterprise organization to which the one or more remediation actions were applied. For example, in updating the output file (e.g., at step 418), open share management computing platform 310 may update the output file to include historical open share information identifying one or more preexisting permissions of the at least one open share of the one or more open shares on the one or more servers associated with the enterprise organization to which the one or more remediation actions were applied. Such historical open share information may, for instance, provide a record of existing permissions of various open shares before such permissions were modified by the remediation actions that may have been applied by open share management computing platform 310 (e.g., at step 417).

In some embodiments, updating the output file may include updating the output file to include error information identifying one or more server clusters for manual processing. For example, in updating the output file (e.g., at step 418), open share management computing platform 310 may update the output file to include error information identifying one or more server clusters for manual processing. Such server clusters may require manual processing in some instances, as discussed above, and such error information identifying the one or more server clusters thus may facilitate such manual processing.

In some embodiments, updating the output file may include updating the output file to include error information identifying one or more servers to which one or more network connections were not established. For example, in updating the output file (e.g., at step 418), open share management computing platform 310 may update the output file to include error information identifying one or more servers to which one or more network connections were not established. Such error information may, for instance, catalog one or more servers that could not be connected to by open share management computing platform 310 (e.g., during the scanning performed at step 415) and which may, for instance, require additional scanning by open share management computing platform 310 in order for one or more open shares to be identified on such servers and/or for one or more remediation actions to be applied to the one or more open shares that may exist on such servers.

At step 419, open share management computing platform 310 may publish the output file. For example, based on updating the output file to include remediation information identifying the one or more remediation actions applied to the at least one open share of the one or more open shares on the one or more servers associated with the enterprise organization (e.g., at step 418), open share management computing platform 310 may, at step 419, publish, via the communication interface (e.g., communication interface 316), to a file sharing platform associated with the enterprise organization, the output file. For instance, at step 419, open share management computing platform 310 may publish the output file (which may, e.g., have been updated at step 418) to a file sharing platform, which may enable one or more network administrators to view and/or download the output file using one or more computing devices (e.g., administrative computing device 320, remote computing device 360) that may access the file sharing platform.

At step 420, open share management computing platform 310 may send the output file to administrative computing device 320. For example, based on updating the output file to include remediation information identifying the one or more remediation actions applied to the at least one open share of the one or more open shares on the one or more servers associated with the enterprise organization (e.g., at step 418), open share management computing platform 310 may, at step 420, send, via the communication interface (e.g., communication interface 316), to the administrative computing device associated with the enterprise organization (e.g., administrative computing device 320), the output file. For instance, at step 420, open share management computing platform 310 may send the output file to administrative computing device 320 to allow the user of administrative computing device 320 to view the information that may be included in the output file, such as one or more status reports that may identify which open shares were found in the scanning, which open shares were preserved, which open shares were deleted, which open shares were modified, and/or the like.

Figure 8:
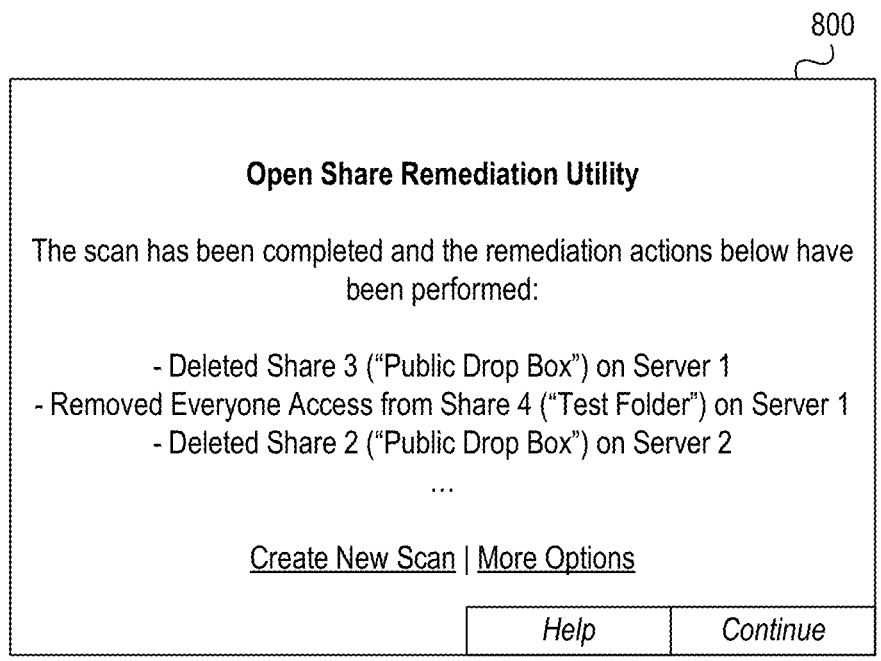

At step 421, administrative computing device 320 may receive the output file from open share management computing platform 310. At step 422, administrative computing device 320 may present one or more remediation results based on the output file. In some instances, in presenting one or more remediation results based on the output file, administrative computing device 320 may present one or more graphical user interfaces associated with the open share management and remediation utility (which may, e.g., be provided by a software application executing on administrative computing device 320). For example, in presenting one or more remediation results based on the output file, administrative computing device 320 may display, cause to be displayed, and/or otherwise present a graphical user interface similar to graphical user interface 800, which is illustrated in FIG. 8. As seen in FIG. 8, graphical user interface 800 may include text and/or other information indicating that the scan for open shares has been completed and that one or more remediation actions have been performed and may further provide the user of administrative computing device 320 with one or more links to access preference pages that may be provided by the open share management and remediation utility, such as one or more preference pages allowing the user of administrative computing device 320 to create a new scan, perform other functions, and/or modify other options.

In some instances, instead of or in addition to allowing a user of a computing device, such as a network administrator using administrative computing device 320, to scan for, modify, and/or delete one or more open shares on one or more servers, the open share management and remediation utility may allow the user of administrative computing device 320 to provide input and/or create input files that cause open share management computing platform 310 to create one or more open shares on one or more servers and/or other computer systems. For example, based on input provided by the user of administrative computing device 320 (e.g., via the open share management and remediation utility) and/or based on one or more commands sent from administrative computing device 320 to open share management computing platform 310, open share management computing platform 310 may create one or more specific types of open shares on one or more specific types of computer systems, may create one or more specific open shares on one or more specific computer systems, and/or the like.

Figure 9:
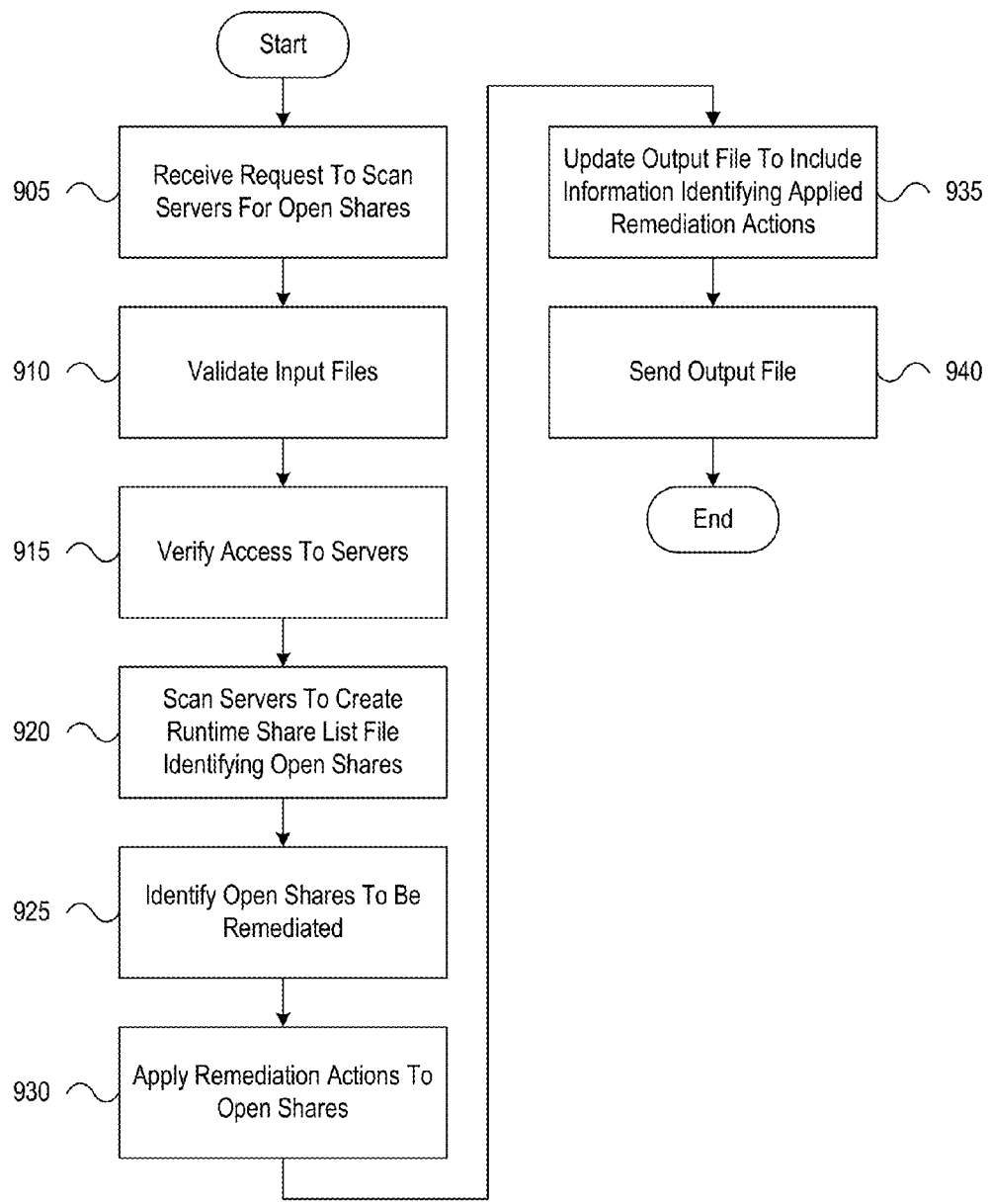
FIG. 9 depicts an illustrative method for managing open shares in an enterprise computing environment in accordance with one or more example embodiments.

FIG. 9 depicts an illustrative method for managing open shares in an enterprise computing environment in accordance with one or more example embodiments. Referring to FIG. 9, at step 905, a computing platform may receive, from an administrative computing device associated with an enterprise organization, a request to scan one or more servers associated with the enterprise organization for open shares. At step 910, the computing platform may validate one or more input files associated with the request to scan the one or more servers associated with the enterprise organization for open shares. At step 915, the computing platform may verify access to the one or more servers associated with the enterprise organization to be scanned for open shares. At step 920, the computing platform may scan the one or more servers associated with the enterprise organization to create a runtime share list file identifying one or more open shares on the one or more servers associated with the enterprise organization. At step 925, the computing platform may identify at least one open share of the one or more open shares on the one or more servers associated with the enterprise organization to be remediated. At step 930, the computing platform may apply one or more remediation actions to the at least one open share of the one or more open shares on the one or more servers associated with the enterprise organization. At step 935, the computing platform may update an output file to include remediation information identifying the one or more remediation actions applied to the at least one open share of the one or more open shares on the one or more servers associated with the enterprise organization. At step 940, the computing platform may send, to the administrative computing device associated with the enterprise organization, the output file.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A system, comprising:
at least one processor;
a communication interface communicatively coupled to the at least one processor; and
memory storing computer-readable instructions that, when executed by the at least one processor, cause the system to:
receive, via the communication interface, and from an administrative computing device associated with an enterprise organization, a request to scan one or more servers associated with the enterprise organization for open shares;
based on receiving the request to scan the one or more servers associated with the enterprise organization for open shares, validate one or more input files associated with the request to scan the one or more servers associated with the enterprise organization for open shares;
based on validating the one or more input files associated with the request to scan the one or more servers associated with the enterprise organization for open shares, verify access to the one or more servers associated with the enterprise organization to be scanned for open shares;
based on verifying access to the one or more servers associated with the enterprise organization to be scanned for open shares, scan the one or more servers associated with the enterprise organization to create a runtime share list file identifying one or more open shares on the one or more servers associated with the enterprise organization;
based on scanning the one or more servers associated with the enterprise organization to create the runtime share list file identifying one or more open shares on the one or more servers associated with the enterprise organization, identify at least one open share of the one or more open shares on the one or more servers associated with the enterprise organization to be remediated;
based on identifying the at least one open share of the one or more open shares on the one or more servers associated with the enterprise organization to be remediated, apply one or more remediation actions to the at least one open share of the one or more open shares on the one or more servers associated with the enterprise organization;
based on applying the one or more remediation actions to the at least one open share of the one or more open shares on the one or more servers associated with the enterprise organization, update an output file to include remediation information identifying the one or more remediation actions applied to the at least one open share of the one or more open shares on the one or more servers associated with the enterprise organization; and
based on updating the output file to include remediation information identifying the one or more remediation actions applied to the at least one open share of the one or more open shares on the one or more servers associated with the enterprise organization, send, via the communication interface, to the administrative computing device associated with the enterprise organization, the output file.

2. The system of claim 1, wherein the administrative computing device is configured to be used by an administrative user of the enterprise organization.

3. The system of claim 2, wherein the administrative user of the enterprise organization is an information security administrator of a financial institution.

4. The system of claim 1, wherein the one or more input files associated with the request to scan the one or more servers associated with the enterprise organization for open shares include a server list file identifying the one or more servers associated with the enterprise organization to be scanned for open shares.

5. The system of claim 4, wherein the memory stores additional computer-readable instructions that, when executed by the at least one processor, further cause the system to:
prior to receiving the request to scan the one or more servers associated with the enterprise organization for open shares, receive, via the communication interface, and from the administrative computing device associated with the enterprise organization, the server list file identifying the one or more servers associated with the enterprise organization to be scanned for open shares.

6. The system of claim 1, wherein the one or more input files associated with the request to scan the one or more servers associated with the enterprise organization for open shares include an exception share list file identifying one or more whitelisted open shares on at least one server of the one or more servers associated with the enterprise organization.

7. The system of claim 6, wherein the memory stores additional computer-readable instructions that, when executed by the at least one processor, further cause the system to:
   prior to receiving the request to scan the one or more servers associated with the enterprise organization for open shares, receive, via the communication interface, and from the administrative computing device associated with the enterprise organization, the exception share list file identifying the one or more whitelisted open shares on the at least one server of the one or more servers associated with the enterprise organization.

8. The system of claim 1, wherein verifying access to the one or more servers associated with the enterprise organization to be scanned for open shares comprises establishing one or more network connections to the one or more servers associated with the enterprise organization to be scanned for open shares.

9. The system of claim 1, wherein verifying access to the one or more servers associated with the enterprise organization to be scanned for open shares comprises verifying that one or more access privileges are sufficient to access one or more user accounts associated with the one or more servers associated with the enterprise organization to be scanned for open shares.

10. The system of claim 1, wherein applying the one or more remediation actions to the at least one open share of the one or more open shares on the one or more servers associated with the enterprise organization comprises deleting a first open share of the one or more open shares on the one or more servers associated with the enterprise organization to remove access to the first open share of the one or more open shares on the one or more servers associated with the enterprise organization.

11. The system of claim 1, wherein applying the one or more remediation actions to the at least one open share of the one or more open shares on the one or more servers associated with the enterprise organization comprises modifying a second open share of the one or more open shares on the one or more servers associated with the enterprise organization to remove access to the second open share of the one or more open shares on the one or more servers associated with the enterprise organization for a first group of enterprise users and preserve access to the second open share of the one or more open shares on the one or more servers associated with the enterprise organization for a second group of enterprise users different from the first group of enterprise users.

12. The system of claim 1, wherein updating the output file comprises updating the output file to include historical open share information identifying one or more preexisting permissions of the at least one open share of the one or more open shares on the one or more servers associated with the enterprise organization to which the one or more remediation actions were applied.

13. The system of claim 1, wherein updating the output file comprises updating the output file to include error information identifying one or more server clusters for manual processing.

14. The system of claim 1, wherein updating the output file comprises updating the output file to include error information identifying one or more servers to which one or more network connections were not established.

15. The system of claim 1, wherein the memory stores additional computer-readable instructions that, when executed by the at least one processor, further cause the system to:
   based on updating the output file to include remediation information identifying the one or more remediation actions applied to the at least one open share of the one or more open shares on the one or more servers associated with the enterprise organization, publish, via the communication interface, to a file sharing platform associated with the enterprise organization, the output file.

16. A method, comprising:
   at a computing platform comprising at least one processor, memory, and a communication interface:
      receiving, by the at least one processor, via the communication interface, and from an administrative computing device associated with an enterprise organization, a request to scan one or more servers associated with the enterprise organization for open shares;
      based on receiving the request to scan the one or more servers associated with the enterprise organization for open shares, validating, by the at least one processor, one or more input files associated with the request to scan the one or more servers associated with the enterprise organization for open shares;
      based on validating the one or more input files associated with the request to scan the one or more servers associated with the enterprise organization for open shares, verifying, by the at least one processor, access to the one or more servers associated with the enterprise organization to be scanned for open shares;
      based on verifying access to the one or more servers associated with the enterprise organization to be scanned for open shares, scanning, by the at least one processor, the one or more servers associated with the enterprise organization to create a runtime share list file identifying one or more open shares on the one or more servers associated with the enterprise organization;
      based on scanning the one or more servers associated with the enterprise organization to create the runtime share list file identifying one or more open shares on the one or more servers associated with the enterprise organization, identifying, by the at least one processor, at least one open share of the one or more open shares on the one or more servers associated with the enterprise organization to be remediated;
      based on identifying the at least one open share of the one or more open shares on the one or more servers associated with the enterprise organization to be remediated, applying, by the at least one processor, one or more remediation actions to the at least one open share of the one or more open shares on the one or more servers associated with the enterprise organization;

based on applying the one or more remediation actions to the at least one open share of the one or more open shares on the one or more servers associated with the enterprise organization, updating, by the at least one processor, an output file to include remediation information identifying the one or more remediation actions applied to the at least one open share of the one or more open shares on the one or more servers associated with the enterprise organization; and based on updating the output file to include remediation information identifying the one or more remediation actions applied to the at least one open share of the one or more open shares on the one or more servers associated with the enterprise organization, sending, by the at least one processor, via the communication interface, to the administrative computing device associated with the enterprise organization, the output file.

17. The method of claim 16, wherein applying the one or more remediation actions to the at least one open share of the one or more open shares on the one or more servers associated with the enterprise organization comprises deleting a first open share of the one or more open shares on the one or more servers associated with the enterprise organization to remove access to the first open share of the one or more open shares on the one or more servers associated with the enterprise organization.

18. The method of claim 16, wherein applying the one or more remediation actions to the at least one open share of the one or more open shares on the one or more servers associated with the enterprise organization comprises modifying a second open share of the one or more open shares on the one or more servers associated with the enterprise organization to remove access to the second open share of the one or more open shares on the one or more servers associated with the enterprise organization for a first group of enterprise users and preserve access to the second open share of the one or more open shares on the one or more servers associated with the enterprise organization for a second group of enterprise users different from the first group of enterprise users.

19. The method of claim 16, wherein updating the output file comprises updating the output file to include historical open share information identifying one or more preexisting permissions of the at least one open share of the one or more open shares on the one or more servers associated with the enterprise organization to which the one or more remediation actions were applied.

20. One or more non-transitory computer-readable media storing instructions that, when executed by a computer system comprising at least one processor, memory, and a communication interface, cause the computer system to:

receive, via the communication interface, and from an administrative computing device associated with an enterprise organization, a request to scan one or more servers associated with the enterprise organization for open shares;

based on receiving the request to scan the one or more servers associated with the enterprise organization for open shares, validate one or more input files associated with the request to scan the one or more servers associated with the enterprise organization for open shares;

based on validating the one or more input files associated with the request to scan the one or more servers associated with the enterprise organization for open shares, verify access to the one or more servers associated with the enterprise organization to be scanned for open shares;

based on verifying access to the one or more servers associated with the enterprise organization to be scanned for open shares, scan the one or more servers associated with the enterprise organization to create a runtime share list file identifying one or more open shares on the one or more servers associated with the enterprise organization;

based on scanning the one or more servers associated with the enterprise organization to create the runtime share list file identifying one or more open shares on the one or more servers associated with the enterprise organization, identify at least one open share of the one or more open shares on the one or more servers associated with the enterprise organization to be remediated;

based on identifying the at least one open share of the one or more open shares on the one or more servers associated with the enterprise organization to be remediated, apply one or more remediation actions to the at least one open share of the one or more open shares on the one or more servers associated with the enterprise organization;

based on applying the one or more remediation actions to the at least one open share of the one or more open shares on the one or more servers associated with the enterprise organization, update an output file to include remediation information identifying the one or more remediation actions applied to the at least one open share of the one or more open shares on the one or more servers associated with the enterprise organization; and based on updating the output file to include remediation information identifying the one or more remediation actions applied to the at least one open share of the one or more open shares on the one or more servers associated with the enterprise organization, send, via the communication interface, to the administrative computing device associated with the enterprise organization, the output file.

* * * * *